United States Patent [19]

Wells

[11] 3,997,257
[45] Dec. 14, 1976

[54] SELECTION FOR MICROFICHE CARTRIDGE

[75] Inventor: Thomas R. Wells, Des Plaines, Ill.

[73] Assignee: Bell & Howell Company, Chicago, Ill.

[22] Filed: Dec. 16, 1974

[21] Appl. No.: 532,800

[52] U.S. Cl. .............................. 353/27 R; 353/103
[51] Int. Cl.² ........................................ G03B 23/08
[58] Field of Search ............................. 353/25–27, 353/26 R, 27 R, 27 A

[56] References Cited
UNITED STATES PATENTS

| | | | |
|---|---|---|---|
| 3,528,735 | 9/1970 | Bluitt | 353/27 |
| 3,720,464 | 3/1973 | Ditscherd | 353/27 |
| 3,754,817 | 8/1973 | Iida | 353/27 |

Primary Examiner—Harry N. Haroian
Attorney, Agent, or Firm—Robert A. Walsh

[57] ABSTRACT

A library file of microfiche film comprises a plurality of spaced parallel film stored inside a cartridge. In a microfiche reader, a reciprocally moving extractor moves into and out of the cartridge to extract and return microfiche. An elevator selectively raises or lowers the cartridge relative to the extractor, thereby selecting a particular microfiche. Suitable interlocks prevent the elevator from moving after a microfiche is extracted and before it is returned to the cartridge.

7 Claims, 7 Drawing Figures

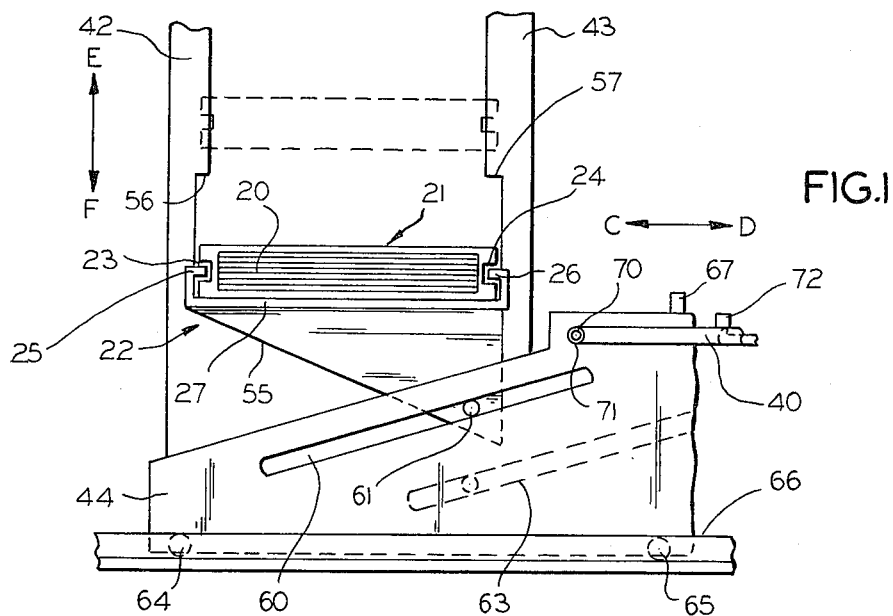

SELECTION FOR MICROFICHE CARTRIDGE

This invention relates to microfiche readers and more particularly to means for selecting one of many microfiche which are pre-loaded in cartridges.

Microfiche film is a known form of graphic data presentation wherein a number of pages are photographically reproduced on a single "card" of microfiche film (such as a 3 × 5 inch to 4 × 6 inch card, for example). Any suitable number (up to, say, a thousand or so) of pages may be photographically formed in any orthogonal array on a single microfiche card of photographic film. The microfiche film may then be placed in an optical reader and moved until a selected image is in an optical projection path leading to a display screen.

It would be uneconomical to have a microfiche reader system for a single microfiche card. The user is more likely to have an entire library file including many microfiche which must be kept in a specific order for quick recall. Therefore, it should be apparent that microfiche must be filed and stored, removed and mechanically manipulated, and then refiled in the cartridge. Each microfiche must be found in the library file with little or almost no search, and then returned to exactly the same spot in the library file, once again ready for future reference.

A cartridge type mechanical microfiche reader may be designed to find and extract the desired microfiche and, after use, to return it to its proper library file location within the cartridge. In greater detail, the preferred reader includes an elevator mechanism which may receive a cartridge and then raise or lower it to a selected level. At that level, an extractor enters the cartridge and removes the microfiche stored there. Later the extractor returns the extracted microfiche to the same level. Accordingly, there is a need for an elevator which may raise or lower the cartridge to a selected level with extreme accuracy.

Therefore, an object of the invention is to provide new and improved microfiche readers and more particularly to provide an elevator mechanism for such readers.

Another object of the invention is to provide microfiche readers having elevators, with suitable interlocks, so that the microfiche position cannot become "lost" in a library file as a result of reader operation. In greater detail, an object is to enable a library file of microfiche to be loaded into cartridges which may then be inserted into the microfiche reader elevator for selection of a single microfiche from the file. Here an object is to provide a mechanical interlock which prevents the cartridge from being moved after a microfiche is extracted and before it is replaced.

Yet another object of the invention is to provide an elevator having a simple and obvious operation so that the reader may be used by people who have no special training in its use. Here an object is to enable, say a casual patron of a public library, for example, to use the reader with only the simplest of instructions.

In keeping with an aspect of the invention, these and other objects are accomplished by providing a microfiche reader having an elevator mechanism including mechanically interacting parts which interlock when a microfiche is out of the library file. After a cartridge containing a library file has been inserted into an elevator, it is raised to and locked in a position where a selected microfiche is adjacent a reciprocating extractor mechanism. Then, the extractor withdraws the microfiche from the cartridge and passes it through the microfiche reader where a selected image is projected onto a screen. Thereafter, the microfiche is returned into the cartridge. Only then may the elevator be unlocked and moved from its locked position.

The nature of a preferred embodiment of the invention may be understood best by a study of the attached drawing wherein:

FIG. 1 is a schematic front view of an elevator mechanism for selectively raising a cartridge containing a library file to a microfiche selecting position;

FIG. 2 is a plan view of the cartridge and an elevator base plate;

FIG. 3 is a perspective view of one corner of the cartridge, showing a mechanism for normally locking the microfiche in place in the cartridge;

Figure 4:
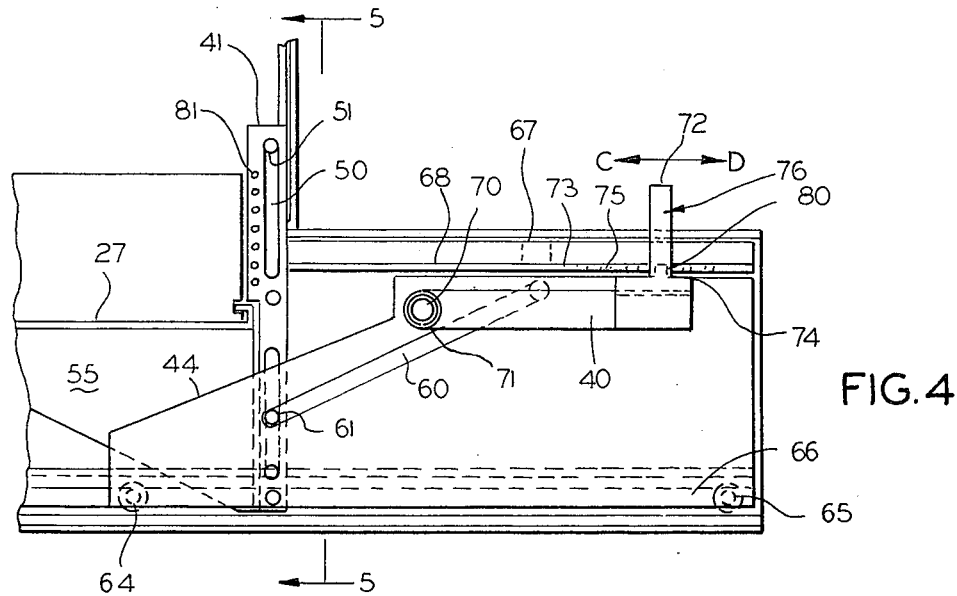
FIG. 4 is a front elevation view of an elevator mechanism.

In reference to FIG. 1, a library file 20 of microfiche is loaded into a cartridge 21 which may then be selected and inserted into an elevator mechanism 22 in a microfiche reader. A number of mechanical interlocking means are provided on or in connection with the cartridge to prevent the reader from being operated incorrectly, misused, damaged, or cause loss of a microfiche while it is extracted from the reader.

Briefly, the cartridge 21 containing the library file 20 may be inserted into the elevator mechanism 22 which thereafter raises the cartridge to the level of a selected microfiche. More particularly, the cartridge 21 has grooves 23, 24 formed in opposite sides to receive tabs 25, 26 on an elevator base plate mechanism 27 (FIG. 2). After cartridge 21 is slid into place between the tabs 25, 26 it fits snuggly against the front of the elevator mechanism. Then, the elevator is operated until a selected microfiche is brought adjacent an extractor mechanism. When the extractor withdraws the microfiche from the cartridge, the elevator is locked in position. After a selected image is projected onto a screen, the microfiche is returned into the cartridge, and the elevator is unlocked.

A number of microfiche film 20 (FIG. 1) are secured in a spaced parallel relationship inside a cartridge 21. Shelves (not shown) are formed inside the cartridge to hold the microfiche in place, with a planar orientation which is horizontal in this configuration. It is irrelevant how the microfiche are put into the cartridge. They may be packaged during a manufacturing process. Or, they may be inserted by the user, either by hand or by placing a microfiche in an automatic reader which inserts it into the cartridge.

The microfiche 20 are locked into the cartridge 21 while the cartridge is out of the reader and before the elevator is raised to a reading position. That is, a plate 30 (FIG. 3) having a detent 31, is pivotally mounted on the cartridge at point 32 and another point (not shown) diametrically opposed on the bottom of the cartridge. A spring (not shown) biases the plate 30 in direction A whereby detent 31 enters the cartridge 21 and fits into a notch formed on each microfiche to hold it in position and prevent its removal from the cartridge. To load and unload the cartridge, the tab 33 is pressed in direction B. Plate 30 pivots at point 32 to move detent 31 out of the cartridge 21. The microfiche may then be inserted into or removed from the cartridge. When the tab 33 is released and plate 30 again pivots on point 32, detent 31 moves back into the cartridge, and the microfiche are again locked into the cartridge.

Figure 6:
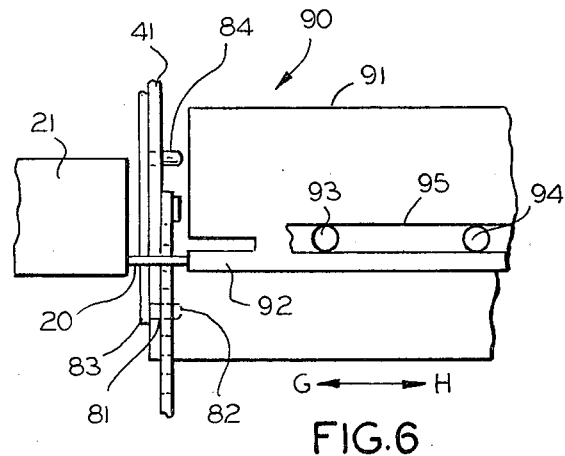
FIG. 6 is a schematic view of the elevator interlocking mechanism, in a locked position.
Figure 7:
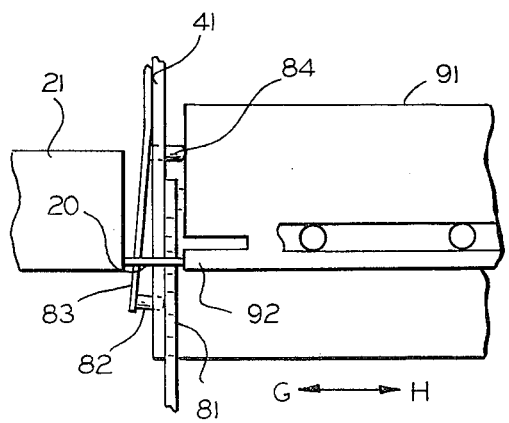
FIG. 7 is a similar schematic view of the interlocking mechanism in a released position.

The elevator 27 (FIG. 1) is arranged to raise the cartridge by a precisely selected distance to thereby position a selected microfiche inside the cartridge adjacent extractor hooks (shown in FIGS. 6, 7). The elevator position is selected and controlled by a lever arm 40 which slides back and forth in directions C, D. Alphanumerical characters may be provided adjacent the arm 40 in order to identify the height of the elevator and, therefore, the selected microfiche.

More specifically, the elevator mechanism comprises the elevator base plate 27, an elevator shaft 41 (FIGS. 4, 5), a pair of oppositely disposed guides 42, 43, and a control plate 44. The elevator base plate 27 (FIG. 2) includes a pair of opposed slots 46, 47 which receive the edges of vertical guides 42, 43, thereby enabling an elevator motion which is perpendicular to the planar orientation of the microfiche, which motion is vertical in the configuration. The elevator shaft 41 (FIGS. 4, 5) includes an elongated slot 50, and fits behind the edge guide 43. A holding pin screw 51 fits through the slot 50 and turns into a threaded hole in the edge guide 43 where it stabilizes the top of the vertical shaft position. The bottom of the elevator shaft is attached to plate 55 (FIG. 1) which is integral with and dependent from the elevator base plate 27. The elevator shaft is vertically stabilized by the edge guides 42, 43 riding in grooves 46, 47. Accordingly, the elevator base plate 27 and shaft 41 assembly can slide up and down on the edge guides 42, 43 without binding.

Means are provided for interlocking the cartridge into the reader mechanism to preclude its removal therefrom after a microfiche is removed from the cartridge. At the same time, the microfiche in the cartridge are also interlocked so that they cannot be inadvertently removed except when the cartridge is in place in the reader. More particularly, the vertical space below edge guide shoulders 56, 57 provides clearance for an insertion of cartridge 21 into the elevator mechanism (FIG. 1). The edge guides 42, 43 slide in slots 46, 47 without contacting the cartridge 21 until shoulder 57 enters slot 58 (FIG. 3) on the cartridge. As the elevator base plate 27 slides up the edge guides 42, 43, it engages the shoulders which control the interlock plate 30 (FIG. 3).

The elevator continues rising after it reaches and passes the shoulders 56, 57. As the shoulder passes over plate 30 (FIG. 3) it pivots in direction B to lift the detent 31 out of the notches in the microfiche in the cartridge. The reader mechanism may now extract the microfiche from the cartridge, but the cartridge cannot be removed from the reader. This way, it is impossible to inadvertently remove a partially empty cartridge from the reader containing less than a full and complete library file.

The elevating mechanism comprises a vertically oriented and horizontally sliding plate 44 having an inclined slot 60 formed therein. Dependent from and integral with the elevator base plate 27 is the plate 55 having a pin 61 fixed perpendicularly thereto. The pin rides in slot 60. Therefore, as plate 44 moves back and forth horizontally in directions C, D, the pin 61 slides vertically along the inclined slot 60, to move the elevator 26 up and down in directions E, F (e.g., dotted lines 63 (FIG. 1) show how the inclined slot has moved in direction D to lower pin 61 in direction F).

Figure 5:
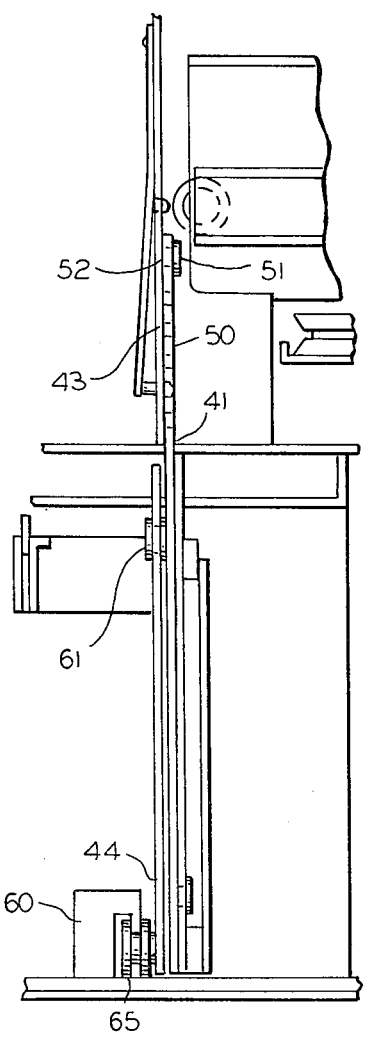
FIG. 5 is a cross sectional view taken along line 5—5 of FIG. 4.

The plate 44 has lower edge wheels 64, 65 which ride on a rail 66 (FIGS. 1, 4). An upper guide tab 67 fits into a slot on a plate 68 (FIG. 4) in the reader housing. The control lever 40 is pivotally attached at 70 to plate 44. A clock spring 71 urges lever 40 to a normally raised position, where tab 72 on lever 40 projects upwardly through another slot 73, also formed in plate 68. Integral with lever 40 is a detent 74 which fits into any one of many holes longitudinally disposed parallel to the slot 73. Thus, the tab 72 may be pushed downwardly, against the bias of spring 70, and slid in directions C, D to a selected spot identified by an alpha-numerical scale 76 (FIG. 4). Then, the tab 72 may be released, whereupon clock spring 71 forces detent 74 into the adjoining hole 80. The mechanical dimensions are such that a single microfiche, identified by the alpha-numerical scale 76, is opposite an extractor arm (FIGS. 6, 7) when ever detent 30 is in a selected hole (such as 74). This way, any microfiche may be selected and extracted from the cartridge.

Means are provided for preventing movement of the elevator while a microfiche has been extracted from a cartridge. More specifically, the elevator shaft 50 (FIG. 4) includes a vertical row of holes 81 which mate with a detent 82 (FIGS. 6, 7) attached to an edge guide 43, and unlatched when the microfiche is in or is returned into its cartridge. This detent 82 extends perpendicularly away from the lower end of a leaf spring 83 which is fixed at its end to edge guide 43. An actuator 84 also extends perpendicularly away from the leaf spring 83, in a displaced position (relative to detent 82) where it engages the extractor. The detent 82 is removed from its penetration of the holes 81 when actuator 84 is pushed in direction G and returns in direction H under leaf spring tension to the locking penetration where the actuator is released. Hence, the elevator base plate 27 cannot be raised or lowered until after a microfiche is properly reinserted into the cartridge 21.

In greater detail, a reciprocally moving extracting mechanism 90 (FIG. 6) removes and then replaces a selected one of the microfiche 20 in the cartridge 21. This mechanism includes an extractor plate 91 which is somewhat box shaped with oppositely disposed extractor hooks 92 dependent therefrom at the lower leading corners of the box. The bottom of the extractor plate 91 has a pair of wheels 93, 94 which ride back and forth in directions G, H. The wheels reset in and ride upon a U-shaped channel 95 which is fixed on the inside of a reader housing. As the extractor 91 moves in direction G, the hooks 92 enter the cartridge 21 and extract the microfiche which is positioned at the level opposite the hooks. These hooks engage a pair of notches (one of which is shown at 98 in FIG. 1) formed on each of the opposing front corners of each of the selected microfiche 20. Then, the extractor 91 and its integral hook 92 are withdrawn in direction H to thereby pull the selected microfiche 20 from the library file inside the cartridge 21.

When the extractor plate 91 has moved away from the extremity of its G direction motion (FIG. 6), it also moves away from operating engagement with the actuator 84. This means that the leaf spring 83 flexes under its own tension and presses the detent 82 through one of the holes 81 which is then opposite detent 82. Detent 82 locks the elevator in the selected elevation so that the level vacated by microfiche 20 remains opposite the extractor hook. Therefore, when the extractor 90 returns in the direction G, the microfiche 20 is returned to the vacant cartridge location.

As the extractor 91 (FIG. 7) moves toward the extremity of its motion in direction G, it engages actuator 84 which flexes the leaf spring 83 and removes the detent 82 from the mating hole 81. After this, the elevator mechanism 27 may again be raised or lowered to select another microfiche. The cartridge structure is such that the elevator 27 may move vertically while the hooks 92 are travelling through vertically aligned notches 98 (FIG. 1) in the microfiche 20. This is the way that the hooks are positioned opposite a selected microfiche.

From the foregoing, it should be apparent that the elevator mechanism provides for precise positioning of the selected microfiche opposite the extractor hooks 92. Thereafter, the selected microfiche may be extracted, but the elevator is interlocked and cannot be raised or lowered. After the microfiche is returned to its proper location inside the cartridge, the interlock is removed and the elevator is again free so that another microfiche may be selected. Or, if the elevator is lowered to the bottom of its travel, the cartridge may be removed.

Those who are skilled in the art will readily preceive how various modifications may be made without departing from the scope and the spirit of the invention. Therefore, the appended claims are to be construed to cover all equivalent structures.

I claim:

1. A system for selecting a microfiche from a library file contained inside a cartridge, said microfiche being suspended in spaced parallel relationship within said cartridge, latch means for normally locking said microfiche in said cartridge, elevator means formed to receive and support said cartridge with said microfiche disposed in a planar orientation, reciprocally movable microfiche extractor means positioned at a predetermined location adjacent said cartridge, said extractor means reaching into said cartridge and pulling said microfiche from and returning it to said cartridge, planar position means for moving said elevator means to a selected position adjacent said extractor means, said elevator means motion being in a direction perpendicular to said planar orientation, means for unlocking said latch means responsive to said motion of said elevator means, and means responsive to movement of said extractor means for selectively and continuously locking said elevator means throughout the entire period while the extractor means is pulling a microfiche from said cartridge far enough to project beyond the cartridge and said period continuing until said extractor means has pushed said microfiche back into said cartridge far enough so that it does not project beyond said cartridge.

2. The system of claim 1 wherein said elevator means comprises a plate mounted for motion in a direction parallel to said planar orientation, a slot on said plate which slot is inclined relative to said planar orientation, a pin riding in said slot and fixed to said elevator means, whereby movement of said plate parallel to said planar orientation causes movement of said elevator means perpendicular to said plate movement, and indicator means for identifying a selected microfiche in terms of said plate movement.

3. A system for selecting a microfiche from a library file contained inside a cartridge, said microfiche being suspended in spaced parallel relationship within said cartridge, elevator means formed to receive and support said cartridge with said microfiche disposed in a planar orientation, reciprocally movable microfiche extractor means positioned at a predetermined location adjacent said cartridge, planar position means for moving said elevator to a selected position adjacent said extractor means, said elevator motion being in a direction perpendicular to said planar orientation, means responsive to movement of said extractor for selectively locking said elevator while a microfiche is removed from said cartridge, said system further including means to prevent removal of said cartridge from said elevator upon movement of said elevator to said selected position comprising: slot means disposed in said cartridge; a clearance for insertion and removal of said cartridge onto said elevator; shoulder means adjacent said clearance for engaging said slot means on said cartridge responsive to elevator movement to said selected position; said shoulder means and said slot means coacting to prevent removal of said cartridge from said elevator after said elevator movement.

4. The system of claim 3 and detent means controlled by said shoulder means for selectively locking or unlocking microfiche in said cartridge.

5. A system for selecting a microfiche from a library file contained inside a cartridge, said microfiche being suspended in spaced parallel relationship within said cartridge, elevator means formed to receive and support said cartridge with said microfiche disposed in a planar orientation, reciprocally movable microfiche extractor means positioned at a predetermined location adjacent said cartridge, planar position means for moving said elevator to a selected position adjacent said extractor means, said elevator motion being in a direction perpendicular to said planar orientation, means responsive to movement of said extractor for selectively locking said elevator while a microfiche is removed from said cartridge, wherein said elevator locking means includes: a fixed shaft for guiding and controlling the movement of said elevator; an elevator shaft disposed adjacent said fixed shaft and movable with said elevator; a plurality of holes extending along a portion of said elevator shaft; detent means disposed on said fixed shaft to selectively engage and disengage said holes to prevent movement of said elevator shaft and said elevator when engaging said holes; and operating means associated with said extractor means and said detent means for moving said detent means into said disengaged position and permitting movement of said elevator shaft and said elevator when said extractor means is positioned at said location adjacent said cartridge to insert or withdraw a microfiche from said cartridge.

6. The system of claim 5 wherein
said detent means comprises:
a spring element fixed at one end to said fixed shaft; and
a pin disposed adjacent the other end of said spring element for selective insertion into and removal from said holes in said elevator shaft.

7. A microfiche selecting system comprising means for storing a microfiche library file in a predetermined geometric orientation at normal resting positions, means for selectively moving said file to a selected and loading position related to said geometric orientation, extracting means movable between two extremities, one of said extremities being an extracting position for hooking and removing a microfiche from said file and returning said microfiche to said selected position within said file, locking means for normally locking said library file when in a selected position, said extracting means engaging said locking means at the extracting extremity for unlocking said library file, said locking means relocking said library file responsive to movement of said extracting means away from the extracting extremity of said extracting means motion and thereafter continuously maintaining said library file in said normally locked condition throughout an entire period beginning when a microfiche begins to move off its normal position in said library file continuing for the entire time while said microfiche is out of said file, and ending when said microfiche returns to its normal position in said library file.

* * * * *